United States Patent [19]
Ehrenkrantz

[11] Patent Number: 6,164,026
[45] Date of Patent: Dec. 26, 2000

[54] RAISED ACCESS FLOOR

[75] Inventor: Ezra D. Ehrenkrantz, Dobbs Ferry, N.Y.

[73] Assignee: New Jersey Institute of Technology, Newark, N.J.

[21] Appl. No.: 08/937,569

[22] Filed: Sep. 25, 1997

[51] Int. Cl.[7] .................................................. E04C 1/39
[52] U.S. Cl. .................... 52/220.2; 52/220.3; 52/505; 52/607
[58] Field of Search ........................... 52/220.2, 220.3, 52/220.5, 220.8, 335, 336, 414, 505, 596, 604, 605, 607; 249/15; 264/35; 404/18, 34; 446/85

[56] References Cited

U.S. PATENT DOCUMENTS

| | | | |
|---|---|---|---|
| 346,782 | 8/1886 | Smith ........................................ | 52/604 |
| 1,083,323 | 1/1914 | Harlow ..................................... | 52/596 |
| 2,706,109 | 4/1955 | Ödman ................................. | 52/605 X |
| 2,741,117 | 4/1956 | Hoseason . | |
| 2,950,575 | 8/1960 | Hellwig . | |
| 3,200,026 | 8/1965 | Brown .................................. | 52/596 X |
| 3,494,381 | 2/1970 | Fork ....................................... | 52/220.5 |
| 3,549,781 | 12/1970 | Jones . | |
| 4,773,196 | 9/1988 | Yoshida et al. . | |
| 4,984,408 | 1/1991 | Habraken et al. . | |
| 4,996,810 | 3/1991 | Forde ..................................... | 52/220.3 |
| 5,015,449 | 5/1991 | Koslowski . | |
| 5,015,450 | 5/1991 | Koslowski . | |
| 5,093,093 | 3/1992 | Koslowski . | |
| 5,424,099 | 6/1995 | Stewart et al. ...................... | 52/741.1 X |
| 5,489,458 | 2/1996 | Sato et al. . | |
| 5,560,171 | 10/1996 | McCoy ................................. | 52/604 X |
| 5,653,797 | 8/1997 | Patel ................................... | 52/741.1 X |

*Primary Examiner*—Carl D. Friedman
*Assistant Examiner*—Kevin D. Wilkens
*Attorney, Agent, or Firm*—Klauber & Jackson

[57] ABSTRACT

In a preferred embodiment, there is a raised floor body having a plurality of parallel bottom arches, each arch defining a lower race thereunder, wherein the lower races are separated from one another by the arches. The raised floor body preferably includes at least one transverse top slot extending into the top surface of the body, thereby defining an upper race. The top slot may be disposed generally perpendicularly to the bottom arches. The body is further preferably provided with at least one vertical opening between the upper and lower races. A cover may be disposed over the top slot, and a liner may be disposed in the top slot. The body is preferably made at least partially from a cementitious material. The raised floor body may also include a mold for forming the cementitious material. The body may be cast in-situ or may pre-cast and installed as whole, by panels, or in individual modular blocks. The present invention also relates to a method for producing the raised floor.

4 Claims, 10 Drawing Sheets

RAISED ACCESS FLOOR

FIELD OF THE INVENTION

The present invention relates to raised floors, false floors, and access floors generally—and, more particularly, but not by way of limitation, to a novel access floor.

BACKGROUND OF THE INVENTION

The present invention concerns raised floors, false floors, or access floors.

Various types of access floors have been proposed in the past. However, a great need still exists for an access floor which is inexpensive yet durable, and which adequately manages any service lines which may be disposed therein or thereunder.

Typically, access flooring does not provide adequate separation of the lines which lie underneath, thereby leading to the possibility of exposing one line to another line in an unseen or unsupervised environment. Often, a jumbled morass of lines or wires results under an access floor, such as may be found, for one example, in a computer room. Such a scenario is inefficient, and may even be dangerous. Various ordinances and rules have been promulgated which regulate the commingling of services, and which require special, or added, coating or covering over certain lines for the sake of protection. These special coverings add to the overall cost of installing and maintaining service lines. Furthermore, an access floor typically allows a generally unbroken air space thereunder, which could act as an additional fire hazard, for example, by allowing air and smoke to unchecked flow therethrough. Local codes may thus further impose smoke or fire alarm detectors and/or fire suppressant systems to be positioned beneath the access floor to provide adequate warnings. Moreover, certain codes and regulations dictate that building fire alarm systems be totally isolated from service lines.

Conversely, if an access floor were to provide isolated or dedicated raceways in which respective service lines could be disposed, then services would not be commingled and less costly shielding may be supplied for the service lines.

Furthermore, many types of access flooring are relatively inflexible as they must rely on the pre-existing sub-flooring for evenness and continuity. Any unevenness or irregularities in the existing subflooring are transferred to the top surface of the surface mounted access floor. Pedestal mounted access floors incur substantial cost for the pedestals and labor to align and level the floor.

A principal object of the present invention is to provide an access floor system which provides an improved degree of service line or wire management.

Another object of the present invention is to provide an access floor system which allows top access to any service line disposed thereunder.

Still another object of the invention is to provide an access floor system which incorporates access channels which serve as independent raceways for one or more services.

Another object is to provide an access floor system having independent raceways which run in both X and Y directions, wherein respective service lines run in respective raceways, and which may be serviced from above.

A further object is to provide an access floor system which can accommodate a variety of service lines, including power, fire, electrical, communication, telephone, fax, computer, water, sewer, HVAC, and other lines.

It is yet another object of the present invention to provide an access floor system which is formed from fire-resistant material.

It is yet another object of the present invention to provide an access floor system which is easily and economically fabricated and/or installed.

It is another object of the present invention to provide a floor system which is fabricated in-situ to accommodate uneven or irregular floors with a customized fit.

It is still another object of the present invention to provide an access floor system comprised of a plurality of cellular blocks arranged in proximity to each other which is formed from fire-resistant material.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a raised floor body having bottom surface provided with a plurality of parallel bottom channels or archways, each channel defining a lower race, wherein the lower races are separated from one another by the walls of the raised floor body. The raised floor body further preferably comprises at least one transverse top slot, but most preferably multiple slots, extending into the top surface of the body, thereby defining an upper race. The top slot may be disposed generally perpendicularly to the bottom arches. The body is further preferably provided with at least one vertical opening for each of the service channels between the upper and lower races. The top slot may intersect with at least one of the lower races, thereby forming a vertical opening between the upper and lower races. A cover is preferably disposed over the top slot. The body may further comprise a liner disposed in the top slot.

The body is preferably comprised of a cementitious material. The raised floor body that is placed on a surface may include the mold for forming the cementitious material. The mold may be flexible, especially in order to conform to any irregularities in the subflooring over which the body is placed. The body may be comprised of gypsum, or concrete, or other suitable material. The body may be cast in-situ or may pre-cast and installed as whole, by panels, or in individual modular blocks.

In another aspect, a preferred embodiment of the present invention comprises a method of forming a raised floor body from a pourable setting material, the method comprising: providing a mold having a plurality of generally parallel longitudinal raised arched or channel-forming portions defining a channel thereunder, each channel defining a lower race; pouring the pourable setting material into the mold to a level over the tops of the channel portions; and allowing the material to set in the mold, thereby forming a continuous block having a plurality of channels. The method may further comprise allowing the material to substantially set in the mold or, to at least partially set in the mold so that one or more top slots may be more easily cut into the top surface of the floor body. At least one displacing member, and preferably a plurality of displacing members, may be placed into the top of the setting material for forming at least one or more slots in the top of the block. At least one opening in the block is preferably provided between the at least one top slot and at least one of the lower races for each service raceway which will run in both x and y directions in a particular embodiment. The top displacing member(s) may be placed atop the setting material as the setting material is being poured into the mold. The displacing member may be weighted to sink into the setting material to be level with the top of the floor and shaped to be buoyant or floatable at that point atop the setting material. The displacing member(s) is(are) preferably disposed generally perpendicularly to the arches.

The method may further comprise removing at least one or more displacing members from the block, wherein the displacing member is used as a form for the service raceway. Conversely, the displacing member may remain disposed in, and become a part of, the body, whereby the displacement member acts as the service raceway.

An alternate method of creating the top slot is to remove material by cutting the top of the block to form at least one or more top slots extending into the top surface of the block. The top slot may be disposed generally perpendicular to the arches. The top slot may extend down into the block to at least partially intersect with the bottom race, thereby defining at least one opening between the bottom race and the top slot, or at least one opening may otherwise be provided between the upper and lower races.

The pourable setting material may be poured into the mold in-situ. The mold may be placed on a subfloor and wherein the mold and the settable material generally conform to the shape of the subfloor, whereby the mold remains disposed between the block and the subfloor.

In another aspect, the present invention concerns a cellular floor block comprising a bottom surface with at least one channel defining a lower race, wherein the top surface of the block is provided with at least one transverse top slot which defines an upper race. The floor block preferably comprises at least one vertical opening between the upper and lower races. The floor block may comprise a plurality of parallel channels, wherein each of the channels is separated from an adjacent channel by a shared bottom portion. The upper race may be substantially perpendicular to the lower race.

The present invention also concerns a flooring system comprised of a plurality of the floor blocks, wherein the blocks are arranged in adjacent relationship, wherein the lower races are disposed parallel to each other, whereby the upper races are disposed parallel to each other and perpendicular to the lower races. The flooring system may further comprise anchoring means for maintaining the blocks stationary. Each block may further comprise recessed outer vertical corners, wherein a plurality of contiguous recessed outer vertical corners of corresponding adjacent blocks define a vertical cavity, and wherein the anchoring means is disposed in the vertical cavity.

The present invention also relates to a raised access floor means for providing a network of selectively independent pathways for service lines, the floor means including at least one unitary body disposed on a supporting surface. The top surface of the body is preferably provided with a plurality of top races, and further preferably provided with at least one vertical opening between at least one top race and the bottom surface of the body. The bottom surface of the body may also define a plurality of bottom races. In one preferred embodiment, the top surface of the body may define a plurality of parallel top races, and the bottom surface may define a plurality of parallel bottom races, wherein the top and bottom races are orthogonally aligned. Preferably, the body is formed from a pourable, settable material or cementitious material. Moreover, the body may be formed in situ. The supporting surface may have pre-existing parallel raceways, such as existing structures or buildings which have one-way races formed in their floors, for example, by cellular steel decks or by holes in pre-cast concrete blocks used in construction of the structure. Thus, another embodiment of the present invention comprises at least one unitary floor body having a top surface provided with a plurality of parallel top races, and wherein at least one unitary body is oriented on the supporting surface such that the top races and the pre-existing raceways are not parallel to each other. In a preferred orientation, the top races and pre-existing races are perpendicular to each other to form an x-y grid of service line pathways. The at least one unitary body may cover the entire floor area of interest or may comprise a plurality of modular unitary blocks disposed adjacent to one another on the supporting surface.

BRIEF DESCRIPTION OF THE DRAWINGS

Understanding of the present invention and the various aspects thereof will be facilitated by reference to the accompanying drawing figures, submitted for purposes of illustration only and not intended to limit the scope of the invention, in which.

DETAILED DESCRIPTION OF THE PREFERRED EMBODIMENTS

Figure 1:
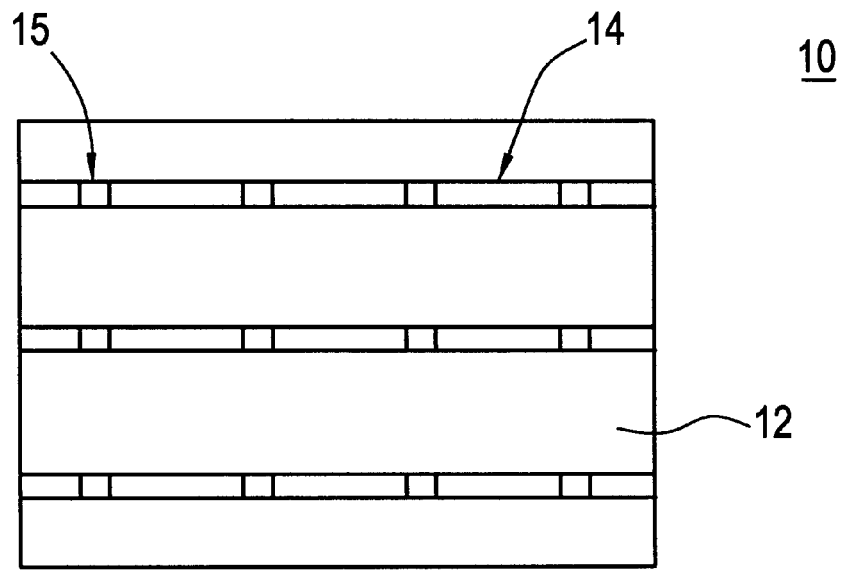
FIG. 1 is a top plan view of one embodiment of an access floor having top slots and vertical openings, in accordance with the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may also be seen on other views.

In one aspect, the present invention relates to a raised access floor means for providing a network of selectively independent pathways for service lines, the floor means including at least one unitary body disposed on a supporting surface. The top surface of the body is preferably provided with a plurality of top races, and further preferably provided with at least one vertical opening between at least one top race and the bottom surface of the body. The bottom surface of the body may also define a plurality of bottom races. Thus, vertical openings may be selectively provided to connect particular top and bottom races which would otherwise be separated from one another by the material of the floor body.

In one preferred embodiment, the top surface of the body may define a plurality of parallel top races, and the bottom surface may define a plurality of parallel bottom races, wherein the top and bottom races are orthogonally aligned.

Preferably, the body is formed from a pourable, settable material or cementitious material. Moreover, the body may be formed in situ.

The supporting surface or subfloor may have pre-existing parallel raceways, such as existing structures or buildings which have one-way races formed in their floors, for example, by cellular steel decks or by holes in pre-cast concrete planks used in construction of the structure. Thus, another embodiment of the present invention comprises at least one unitary floor body having a top surface provided with a plurality of parallel top races, and wherein the at least one unitary body is oriented on the supporting surface such that the top races and the pre-existing raceways are not parallel to each other. In a preferred orientation, the top races and pre-existing, races are perpendicular to each other to form an x-y grid of service line pathways. The at least one unitary body may cover the entire floor area of interest or may comprise a plurality of modular unitary blocks disposed adjacent to one another on the supporting surface.

In another aspect, the present invention relates to a raised floor body having a bottom surface provided with a plurality of parallel bottom channels or archways formed by arches, each arch defining a lower race thereunder, wherein the lower races are separated from one another by the arched portions of the floor body. Thus, one or more service lines may pass through the lower races. Respective service lines may be disposed in respective races, whereby each service line is physically isolated from every other service line by the portions of the floor body which define the lower races.

As used herein, "arch" or "arched portion" generally refers to the wall or walls on the bottom surface of the floor body or floor block of the present invention which surrounds and defines the bottom race(s). The arch may assume various shapes, sizes and/or configurations, such as rounded, hemispherical, rectangular, square, hexagonal, trapezoidal, etc.

Preferably, the volume occupied by the floor body is primarily filled with the material from which the floor body is fabricated. For example, the majority of the volume between the races and the top surface is occupied by solid material, which is further preferably rigid or at least semi-rigid.

In one particular embodiment, the floor body has a smooth or unbroken top surface which provides a supporting surface or platform for the user. The floor body thus preferably provides a solid support base on top of an existing floor or subfloor.

Additionally the floor body may provide a solid feel underfoot for the user, especially as compared to raised floors or access floors which are commonly used in computer rooms and the like.

In a preferred embodiment, the raised floor body further comprises at least one transverse top slot extending into the top surface of the body, thereby defining an upper race. Further preferably, a plurality of top slots are provided in the top surface of the body to define a plurality of upper races.

As with the lower races, one or more service lines may pass through the upper races. Respective service lines may be disposed in respective races, whereby each service line is physically isolated from every other service line by the walls of the floor body which define the upper races.

In one preferred embodiment, the top slot is disposed generally perpendicular to the bottom arches, thereby providing a generally orthogonal X-Y grid of upper and lower races.

Further preferably, the body is provided with at least one vertical opening between the upper and lower races. For example, a given lower race may communicate with a plurality of upper races by virtue of one or more vertical openings extending from the upper races to the lower race. Similarly, a given upper race may communicate with a plurality of lower races by virtue of one or more vertical openings extending from the lower races to the upper race.

The raised floor body further preferably includes a cover disposed over the top slot. Thus, each upper race may be covered by a respective cover, which further preferably is substantially flush with the remainder of the top surface of the floor body.

A liner may be disposed in the top slot, whereby the liner forms at least part of the upper race. The liner may be used in the formation of the top slot and left in place to form part of the floor body. Alternatively, the liner may be inserted into the top slot and left in place to form part of the floor body. The liner may be made from a material or construction which is required for a given service line, for example as required for electrical wiring by local codes.

In a preferred embodiment, the body is comprised of a settable or cementitious material. Thus, the body, or a part thereof, may be formed by applying the settable or cementitious material into a mold which is preformed in a desired configuration. The body may be then be removed from the mold after having at least partially set. Alternatively, the set material may remain in contact with the mold, such the mold forms part of the body itself.

Preferably, the mold, and particularly the bottom surface of the mold, is flexible, so as to conform to the surface of the subfloor when the mold is positioned and the material dispensed in situ. A non-flexible mold may be set on a cementitious bead of mortar or mastic for leveling purposes. Of course, the floor body may be pre-cast.

The settable or cementitious material is preferably comprised of gypsum. The floor body may instead be comprised of concrete.

Thus, in another aspect, the present invention relates to a method of forming a raised floor body from a pourable setting material comprising: providing a mold having a plurality of generally parallel longitudinal raised arched or channel-forming portions, each channel defining a lower race; pouring the pourable setting material into the mold to a level over the tops of the channel portions; and allowing the material to partially set in the mold, thereby forming a continuous block having a plurality of arches. The material may be allowed to substantially set in the mold, or the material may be allowed to partially set so that one or more top slots may be cut into the top surface of the floor body. The continuous block may cover the entire subfloor surface of interest, or a section thereof. The continuous block may also comprise a modular or cellular block to be used in conjunction with other similar blocks to cover the area of interest.

At least one displacing member may be placed on top of the setting material for forming at least one slot in the top of the block.

At least one opening may be provided in the block between the at least one top slot and at least one of the lower races. The opening may be formed by cutting or drilling or sawing or by other means known to those skilled in the art.

The at least one displacing member may be placed atop the setting material as the setting material is being poured into the mold. In a preferred embodiment, the displacing member is floatable but level with the top of the setting material.

The displacing member is preferably disposed generally perpendicularly to the arches.

In a particular embodiment, the at least one displacing member is removed from the block.

The block may be separated from the mold.

Material may be removed from the top of the block to form at least one top slot extending into the top surface of the block, and the top slot may further be disposed generally perpendicular to the arches.

The top slot may extend down into the block to at least partially intersect with the bottom race, thereby defining at least one opening between the bottom race and the top slot.

One way of connecting top and bottom channels is to form the block so as to partially intersect the top and bottom channels and to provide closers to close off such unwanted intersections. Another way to connect top and bottom channels is to create separate top and bottom channels and then to cut through at least a portion of the material which separates the channels. In one preferred embodiment, the opening from top to bottom is large enough so as to permit a user to reach in from the top to the bottom to pull wires or other service lines or objects disposed therein.

In a preferred embodiment, the setting material is poured into the mold in-situ. Thus, the mold may be placed on a subfloor, and the mold and the settable material may generally conform to the shape of the subfloor, whereby the mold remains disposed between the block and the subfloor after pouring and setting.

In another aspect, the present invention provides a cellular floor block comprising a bottom surface with at least one channel defining a lower race, wherein the top surface of the block is provided with at least one transverse top slot which defines an upper race.

The floor block preferably has at least one vertical opening between the upper and lower races.

The floor block may further have a plurality of parallel channels, wherein each of the channels is separated from an adjacent channel by a shared bottom portion of the block.

The upper race is preferably substantially perpendicular to the lower race, although other orientations between the upper and lower races may be desirable for a given application.

Thus, the present invention contemplates a flooring system comprised of a plurality of the floor blocks, wherein the blocks would be typically arranged in adjacent relationship, wherein the lower races are disposed parallel to each other, whereby the upper races are disposed parallel to each other and perpendicular to the lower races.

The flooring system may further include anchoring means for maintaining the blocks stationary with respect to the ground surface upon which they rest. In one particular embodiment, the block further comprises recessed outer vertical corners wherein a plurality of contiguous recessed outer vertical corners of corresponding adjacent blocks define a vertical cavity, and wherein the anchoring means is disposed in the vertical cavity. A block connecting means may also be provided for securing the blocks to one another. For example, each block may be provided with one or more side openings in one or more sidewalls, wherein the side openings of adjacent blocks are aligned in proximity, and a spline member is inserted therebetween, resting at least partially in both the adjacent side openings. In another particular embodiment, the top surfaces of adjacent blocks may be attached to each other to substantially prevent movement of the blocks with respect to one another.

In another embodiment, the present invention concerns an access floor system comprising at least one block including at least two spaced apart parallel vertical ribs, and a transverse portion connecting the vertical ribs and defining at least one bottom race disposed beneath the transverse portion and between two of the vertical ribs, the bottom race extending through the block generally parallel to the ribs, the transverse portion including at least one transverse top slot extending through the block generally perpendicular to the ribs and extending down into the transverse portion to at least partially intersect with the bottom race, thereby defining at least one opening between the bottom race and the top slot. The vertical ribs and the transverse portion are integrally formed into a single unitary body. The block may include a removable cover disposed over the top slot.

The access floor system thus may include a plurality of adjacent blocks wherein the top slots of at least two of the blocks are aligned. Alternately, or in addition, the access floor system may include a plurality of adjacent blocks wherein the bottom races of at least two of the blocks are aligned.

The blocks may have shaped corners, wherein a plurality of contiguous corners of respective adjacent blocks together define a vertical channel. The shaped corners may be concave corners or chamfered corners. The access floor system may also include an anchor means disposed in the vertical channels. The anchor means may be a weight or a settable material. The blocks may be made of a cementitious material.

In yet another embodiment, the present invention relates to a means for providing a false floor over a ground surface which includes a plurality of adjacent modular blocks disposed upon the ground surface, each block having at least one bottom channel and at least one top channel, wherein the at least one bottom arch and the at least one top channel of each block are disposed generally perpendicularly to each other, wherein the bottom arches of the plurality of blocks define at least one downwardly facing bottom race, and wherein the top channels of the plurality of blocks at least partially define at least one top race. At least one of the blocks may be provided with at least one top channel which intersects at least one bottom arch, thereby providing an opening between the at least one top channel and the at least one bottom arch. The plurality of modular blocks may be aligned to form at least one plurality of parallel races. At least one of the blocks may include cover means disposed over the top channels, whereby the top race is enclosed.

In another aspect, the present invention relates to a method of forming an access floor block from a pourable setting material. The method comprises: providing a mold for casting a block to have at least two spaced apart parallel vertical ribs and a transverse portion, wherein the transverse portion connects the vertical ribs and defines at least one bottom race disposed beneath the transverse portion and between two of the vertical ribs, the bottom race extending through the block generally parallel to the ribs; pouring the pourable setting material into the mold; allowing the material to at least partially set in the mold; separating the block and the mold; and removing material from the transverse portion of the block to form at least one transverse top slot extending through the block generally perpendicular to the ribs and extending down into the transverse portion to at least partially intersect with the bottom race, thereby defining at least one opening between the bottom race and the top slot. The method may further involve allowing the material to substantially set in the mold before being removed from the mold. Thus, the pourable setting material is poured into the mold in-situ.

If the block is to be removed from the mold, the mold may be substantially comprised of steel, plastic or some other material which may optionally be coated with a release agent so that the mold does not bond with the pourable setting material.

Figure 2:
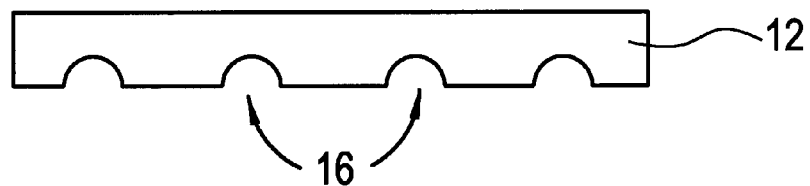
FIG. 2 is a side elevational view of the access floor of FIG. 1 showing the top slots.

FIGS. 1 and 2 show an access floor 10 according to the present invention. A floor body 12 is provided with a plurality of upper races 14 which are shown disposed parallel to each other. Vertical openings 15 are provided in the floor body to provide access to the underside of the floor body 12.

Figure 3:
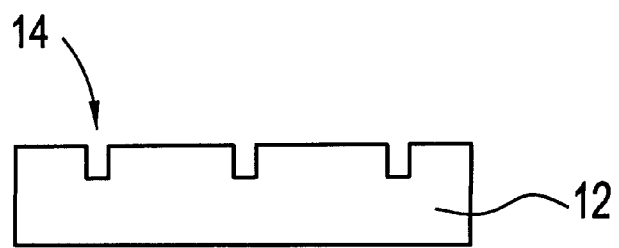
FIG. 3 is a front elevational view of an access floor according to FIG. 1 and having bottom races.

As seen in FIG. 3, the bottom surface of the floor body may define a plurality of bottom or lower races 16 which are shown disposed parallel to each other. Thus, in a preferred embodiment, the upper races 14 may be disposed perpendicular to the lower races 16. Furthermore, vertical openings 15 may be provided between the upper and lower races 14, 16, to allow communication therebetween.

Thus, FIG. 1 shows a top plan view of the access floor 10, while FIG. 2 is a side elevational view showing the upper races 14. FIG. 3 is a front elevational view of the embodiment shown in FIGS. 1–2 provided with the lower races 16. In another embodiment, FIG. 3 could also represent a floor body which does not have upper races, and which may additionally have vertical openings provided in the floor body to allow communication between the lower races and the top surface of the floor body.

Figure 4:
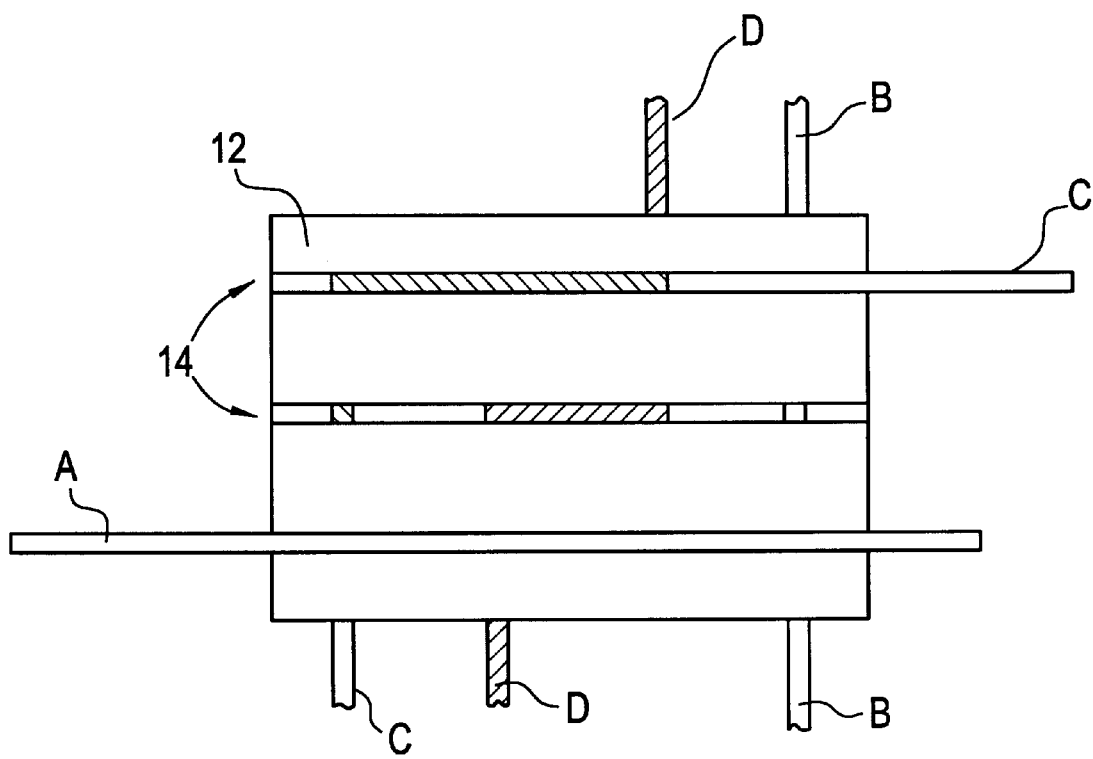
FIG. 4 is a top plan view of an access floor according to FIGS. 1–3 having top and bottom races and vertical openings, and having a plurality of conduits or service lines disposed therethrough.
Figure 5:
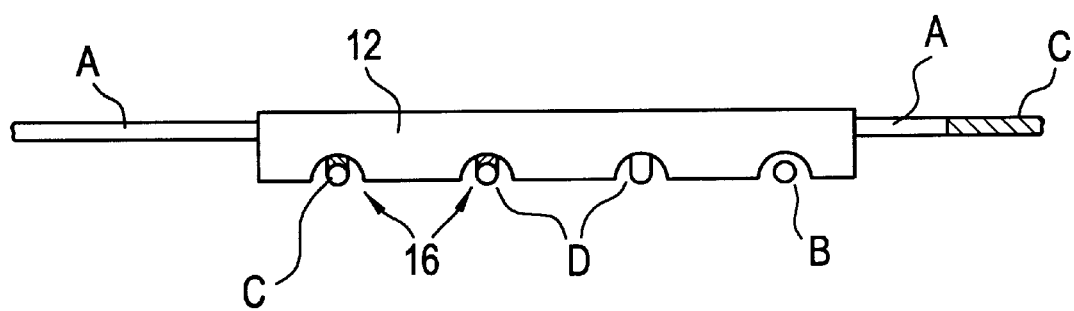
FIG. 5 is a front elevational view of the access floor and conduits according to FIG. 4.

FIGS. 4 and 5 show the embodiment of the access floor 10 corresponding to FIGS. 1–3 with first, second, third, and fourth service lines or conduits (A, B, C, and D) passing through the upper and lower races 14, 16 of the flooring system 10 in separate tracks. The first conduit A in FIG. 4 passes from left to right in a straightforward manner through the lowermost top races 14. The second conduit B passes through the rightmost bottom races 16. The third conduit C passes through the leftmost bottom races 16, through the vertical opening 15 in the top left area of the floor, and through the topmost upper races 14. The fourth conduit D passes through the bottom races 16 second from left, then up through the vertical opening in the left middle area of the floor, through the middlemost top races, down through the vertical opening in the right middle area of the floor, then through the bottom races second from right.

FIG. 5 shows an end view of the conduits A, B, C, D and access floor 10 of FIG. 4.

Thus, the access floor according to the present invention may provide a plurality of paths for a plurality of conduits, wherein each conduit, type of conduit, is separated from the others by the arches or walls of the access floor.

Although not shown in FIGS. 1–5, covers may be provided over the top races in order to provide more of an unbroken or even surface on top of the access floor. The cover also provides physical isolation and protection for the service lines disposed thereunder, for example, from dust, dirt, foreign objects, etc. The cover is preferably adapted to support a compressive load from above, such that foot traffic, furniture, or other intended activities and objects may be accommodated on top of the access floor and meet building code requirements for electrical or other services.

Figure 6:
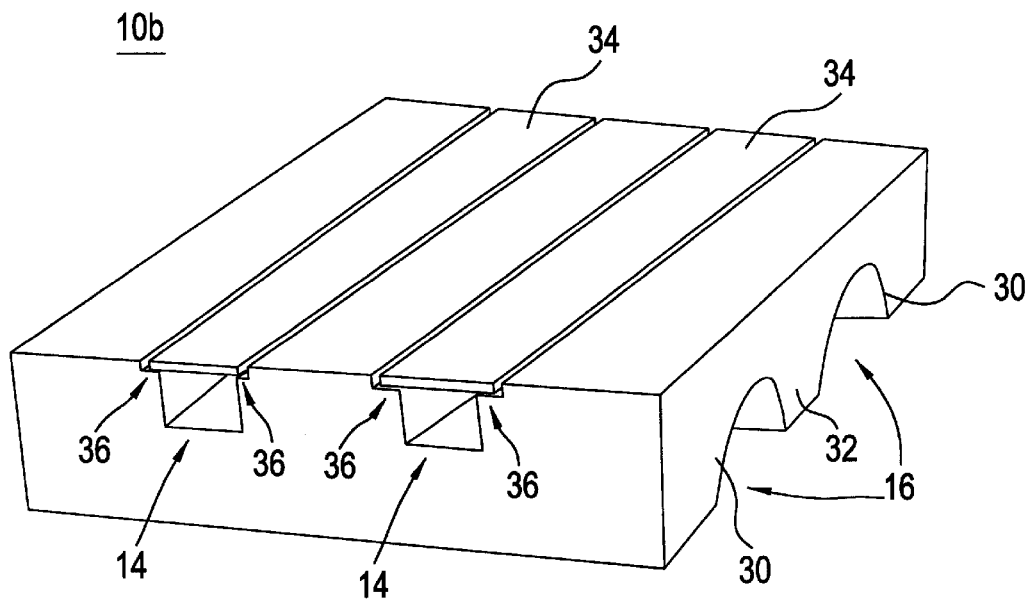
FIG. 6 is a perspective view of another embodiment of a floor body according to the present invention.

FIG. 6 shows an access floor or a section of the floor system 10b according to the present invention. The section includes two bottom races 16 and two top slots 14. The two bottom races 16 are formed from two arches 30, wherein each of the arches has a shared bottom portion 32 in common with the adjacent arch. A cover 34 is disposed over each top slot 14. The portions of the floor which define each of the top slots 14 include a pair of shoulders 36 for supporting the cover 34.

It should be noted that FIG. 6 may represent either an access floor, or a section of a larger substantially continuous or integrated access floor, or a single modular or cellular block which contributes to forming an access floor when situated adjacent like modular blocks.

The access floor is preferably erected in-situ, especially where the original subflooring is irregular or uneven. A cementitious material may be placed, or poured, or sprayed, or otherwise applied, into a mold which is pre-shaped or pre-formed into a desired configuration. After the cementitious material sets, or partially sets, the mold may be removed from the set material. Such removal may be enhanced by spraying a releasing agent or the like onto the mold before the settable material is placed thereon, as known by the skilled artisan. On the other hand, the mold, i.e. the mold material or mold form material, may be left in contact with the cementitious material so as to form part of the access floor. In a preferred embodiment, the mold is made from an at least partially flexible material which can at least partially conform to the surface of a subfloor as the settable material is placed in the mold form. For example, the mold may be made from a plastic material such as PET.

On the other hand, sections or panels or blocks of the access floor may be made in advance, perhaps at a remote location, to be subsequently installed at a desired location on top of an existing floor or subfloor.

Figure 7:
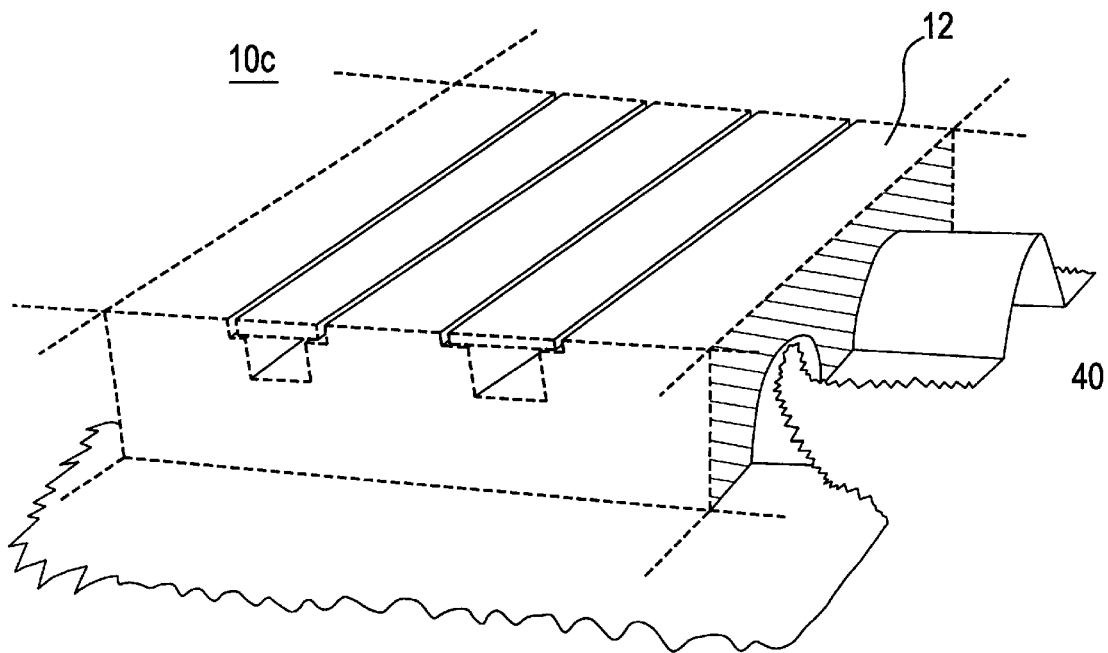
FIG. 7 is a perspective view of a portion of a floor body with its mold.

FIG. 7 shows a cutaway perspective view of a section of an access floor 10c, according to the present invention wherein the mold form 40 is shown in contact with the cementitious material which forms the body of the access floor 10c.

If the mold 40 is left in place to form part of the access floor 10c, then a portion of the mold 40 must be cut and removed to form a vertical opening 15 through which a service line might pass.

Figure 8:
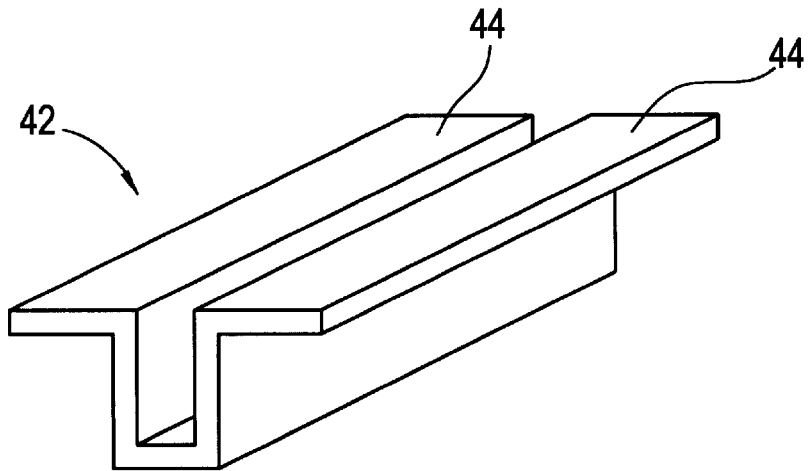
FIG. 8 is a perspective view of one embodiment of a displacement member for forming a top slot according to the present invention.

FIG. 8 shows one embodiment of a displacement member 42 for forming a top slot 14 in an access floor, or a section of an access floor, or a floor block, according to the present invention. The displacement member 42 may be adapted to float in the cementitious material before the material sets so as to displace the material at a location where a top slot is desired. The displacement member may have a specific gravity which is greater than the specific gravity of the settable material, or may be weighted, so that the displacement member tends to sink prior to the material setting. The generally horizontal arms or wings or side portions 44 of the displacement member 42 may be adapted to provide an adequate surface area for buoyancy, depending upon, for example, the density and thickness of the displacement member 42, the material properties of the settable material, etc. It is preferred that the settable material be a self leveling material such as gypsum. Thus, as the settable material is poured or sprayed or otherwise dispensed into the mold, the settable material seeks its own level, and the displacement member(s) 42 are placed atop the settable material before the maximum level of settable material within the mold 40 is reached so that the displacement member(s) 42 may occupy the space(s) which will form the top race(s) 14. Alternatively, the displacement members may be fixed with respect to the mold 40, so that the settable material rises up to meet the displacement member(s) 42 and flows upward and possibly at least partially around the members.

Figure 9:
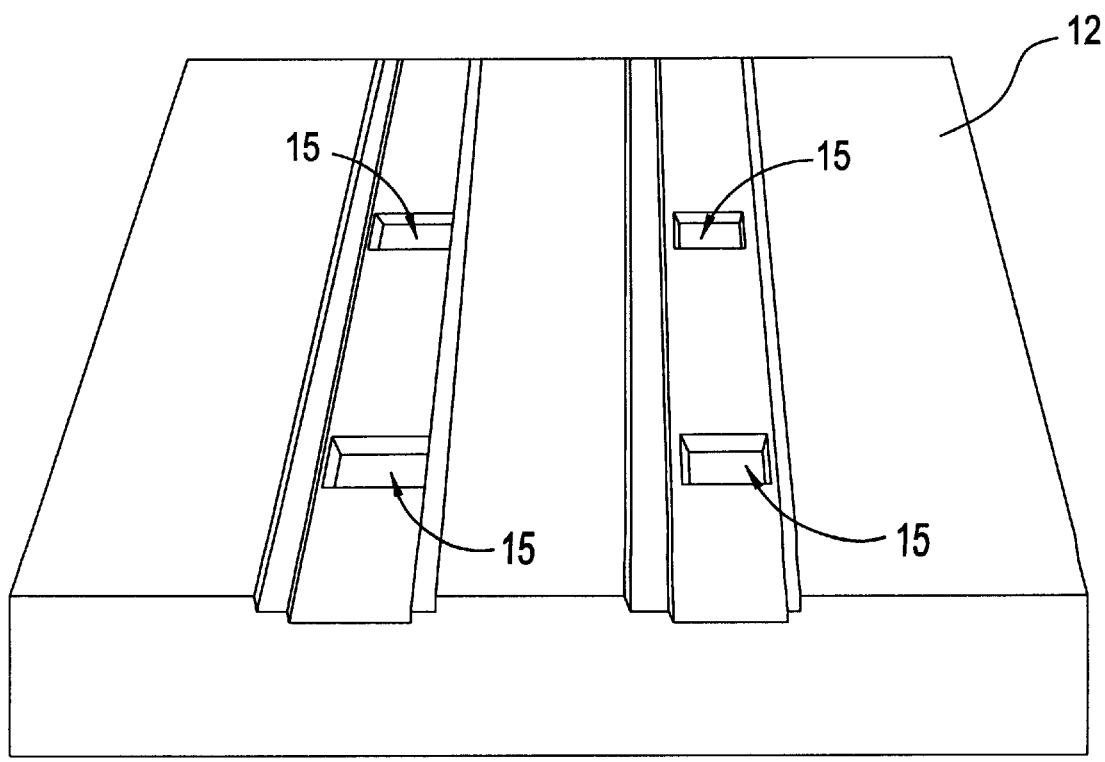
FIG. 9 is another perspective view of the floor body of FIG. 6 showing vertical openings between the top and bottom races.

FIG. 9 shows an access floor, or a section of an access floor 10b as shown in FIG. 6 of the present invention, or a modular or cellular block thereof as referred to hereinabove, wherein the displacement members 42 have been removed and vertical openings 15 in the body of the access floor have been provided between the upper and lower races 14, 16. The vertical openings 15 may be cut through the cementitious material, which is at least partially set, at desired locations by techniques known to those skilled in the art.

Displacement members 42 may assume various shapes and/or sizes, and may further be adapted to be removed from the cementitious body or may remain in place to form a part of the access floor. Thus, the displacement member may itself form at least a part of a top race 14 of the access floor.

Figure 10:
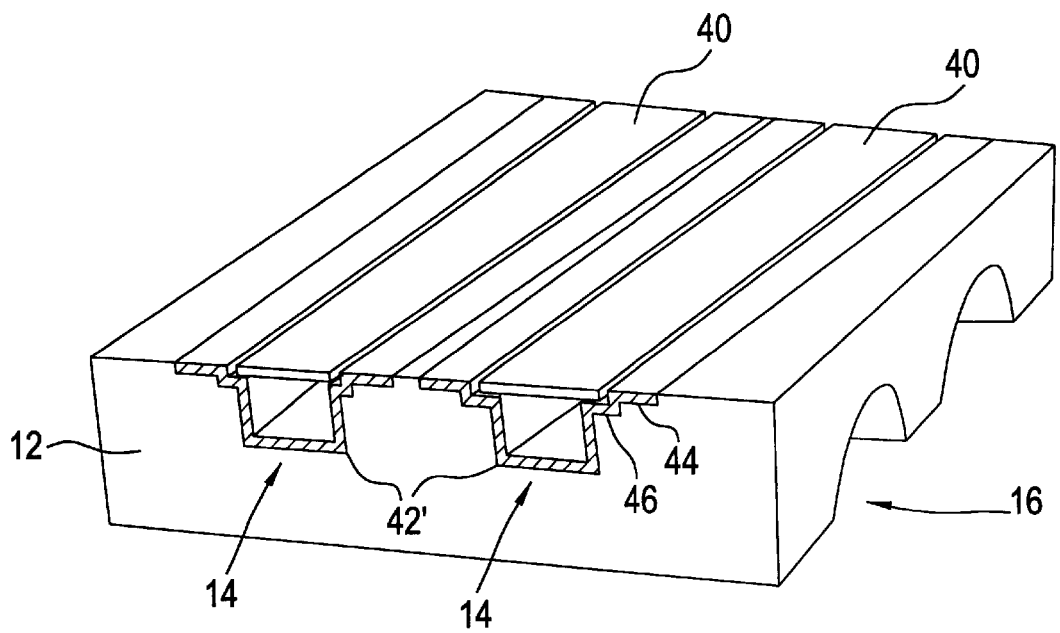
FIG. 10 is a perspective view of another embodiment of a floor body according to the present invention wherein displacement members form a part of the floor body and define at least part of the top race.

FIG. 10 shows displacement members 42' which are retained within the access floor to form part of the top races 14. The displacement members 42' illustrated have outer wings 44 for supporting the displacement member in the setting material as well as an inner shoulder 46 for supporting a cover, such that the cover is disposed at or below the top level of the cementitious body.

The bottom races 16 may also assume a variety of desired shapes and sizes. The bottom race 16 may typically be formed with a mold sheet having a preformed shape which corresponds to a desired shape.

Figure 11:
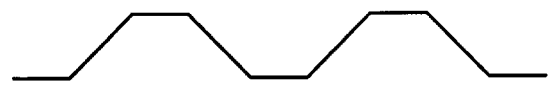
FIG. 11 is a cross-sectional end view of part of a mold sheet for forming trapezoidal shaped bottom races according to the present invention.
Figure 12:
FIG. 12 is a cross-sectional end view of part of a mold sheet for forming square bottom races according to the present invention.
Figure 13:
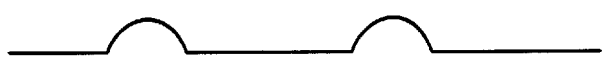
FIG. 13 is a cross-sectional end view of part of a mold sheet for forming semi-circular shaped bottom races according to the present invention.

For purposes of illustration, FIGS. 11–13 show various configurations of such a mold sheet.

FIG. 11 shows a cross-section of part of a mold sheet for forming trapezoidal shaped bottom races.

FIG. 12 shows part of a mold sheet for forming square bottom races.

FIG. 13 shows part of a mold sheet for forming rounded shaped bottom races.

Particular mold patterns may be preferred, for example, because of an ability to more easily release the cementitious material from the mold, if such feature is desired.

Figure 14:
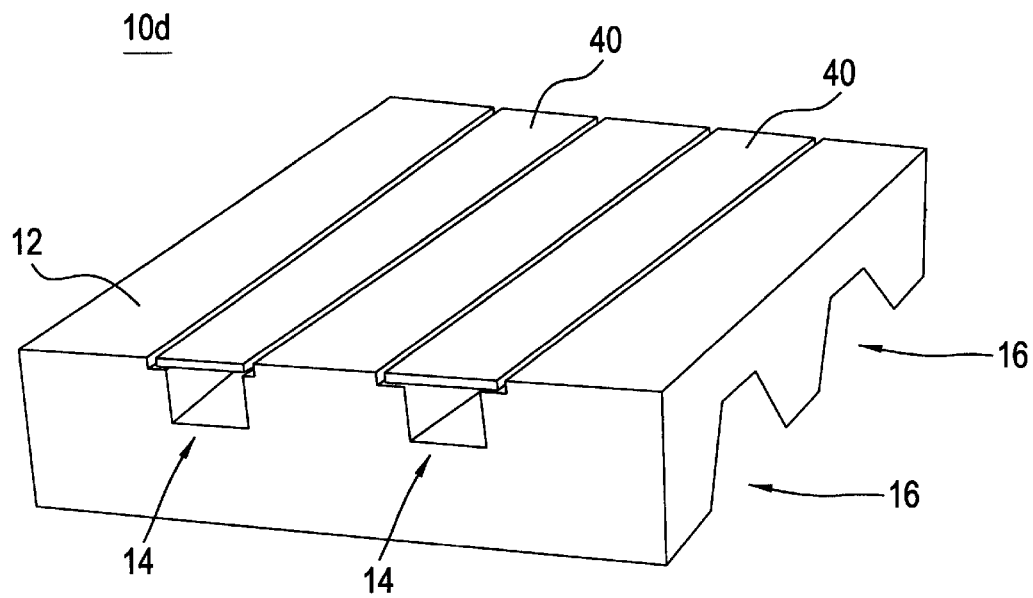
FIG. 14 is a perspective view of another embodiment of a floor block according to the present invention with generally trapezoidal shaped bottom races.

For example, FIG. 14 shows another embodiment of a floor, or floor section, or floor block 10d according to the present invention having generally trapezoidal shaped bottom races 16.

Figure 15:
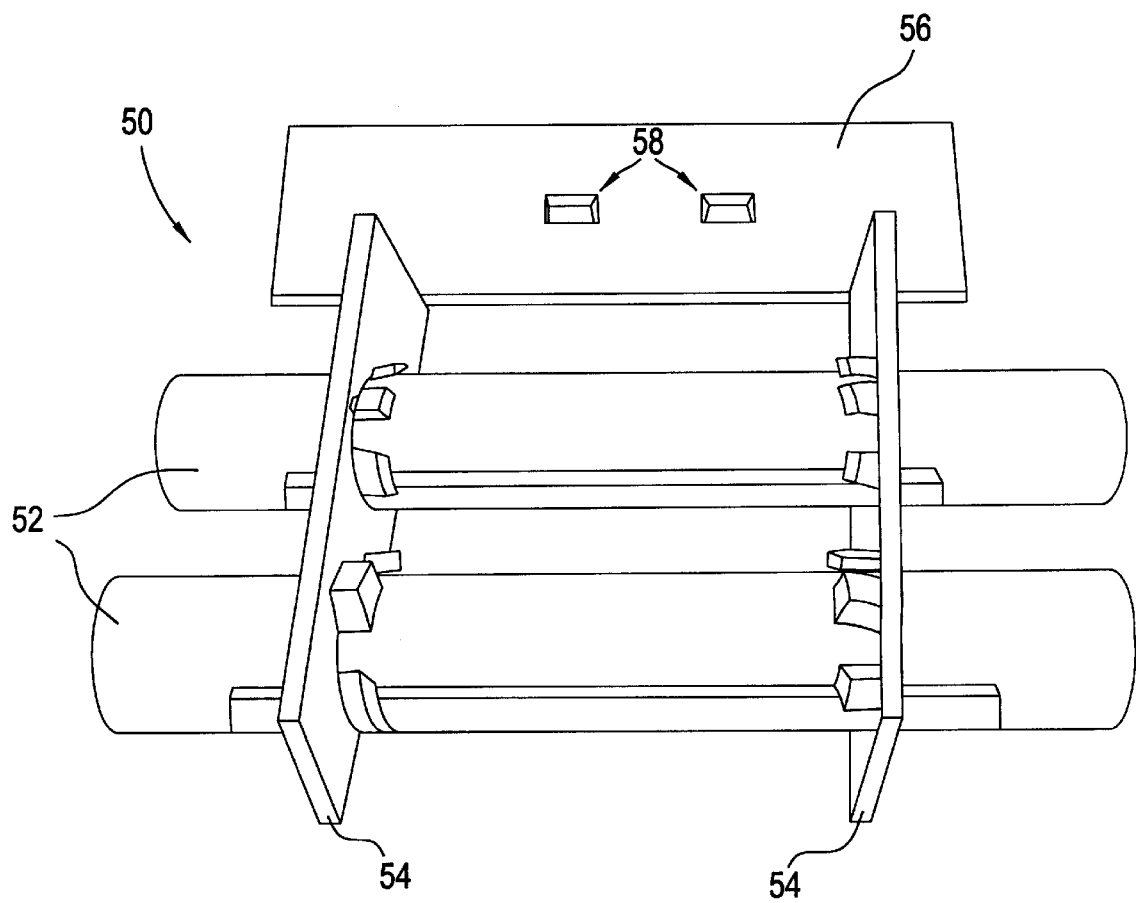
FIG. 15 is a perspective view of a mold, in a partially disassembled state, for forming one embodiment of a floor body according to the present invention.
Figure 16:
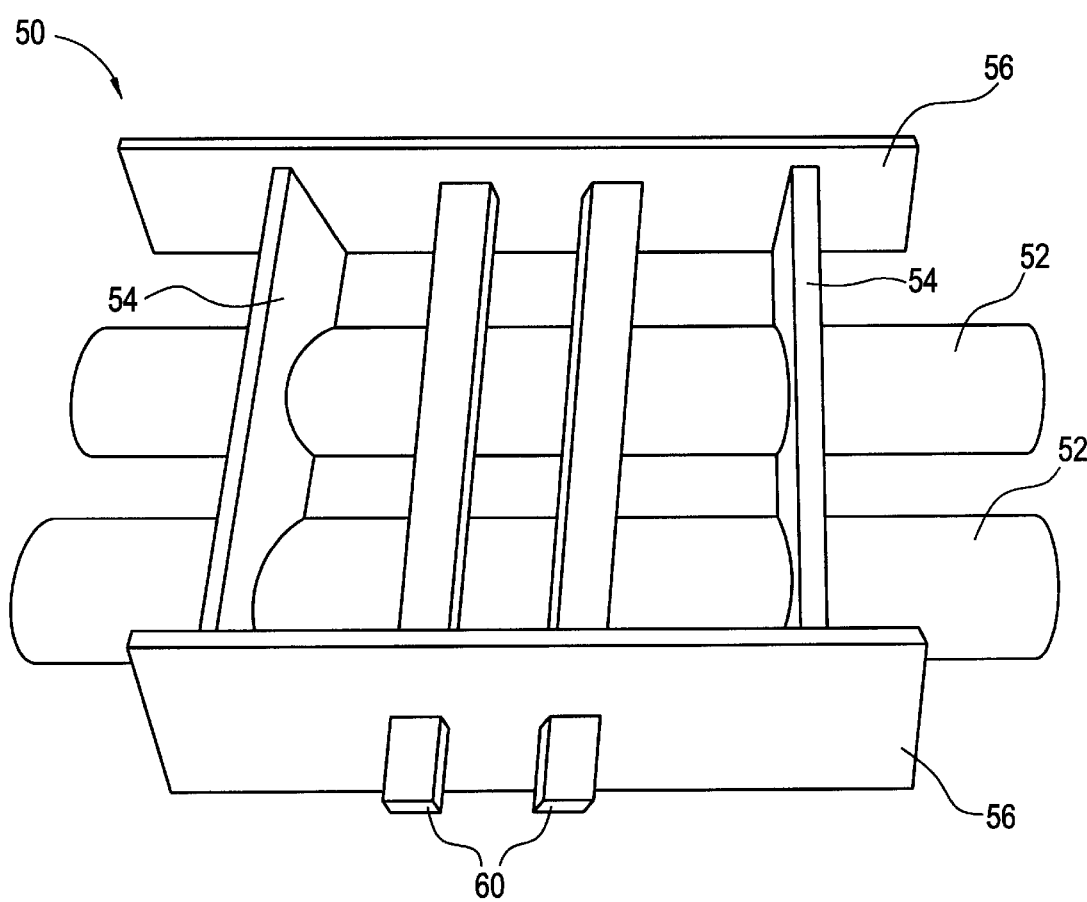
FIG. 16 is a perspective view of the mold of FIG. 15 in an assembled state.

FIGS. 15–16 show one method of forming an access floor or portion thereof with a mold 50 prepared from a number of discrete parts. The settable material may make direct contact with the existing subfloor, or a bottom sheet layer may first be disposed between the existing floor and the mold 50 so that the settable material contacts the bottom sheet layer.

FIG. 15 shows the mold 50 in a partially disassembled state. Two semicylindrical tubes 52 face downward and are spaced apart by two transverse supports 54. The transverse supports 54 and the two semicylindrical tubes 52 abut the ground surface upon which they rest. The side support 56 is then brought into contact with the two transverse supports 54 and similarly abuts the ground surface. The side support 56 is provided with openings 58.

FIG. 16 shows both side supports 56 abutting opposite ends of the transverse supports 54 and supporting two transverse slats 60 in respective openings 58. The slats 60 form the top slots 14 of the floor block. Thus, a pourable setting material may be poured into the mold 50 formed by the transverse supports 54, side supports 56, tubes 52, and transverse slats 60. The material is then allowed to set and the mold removed. If desired, the tubes 52 may remain in place and form part of the access floor.

Figure 17:
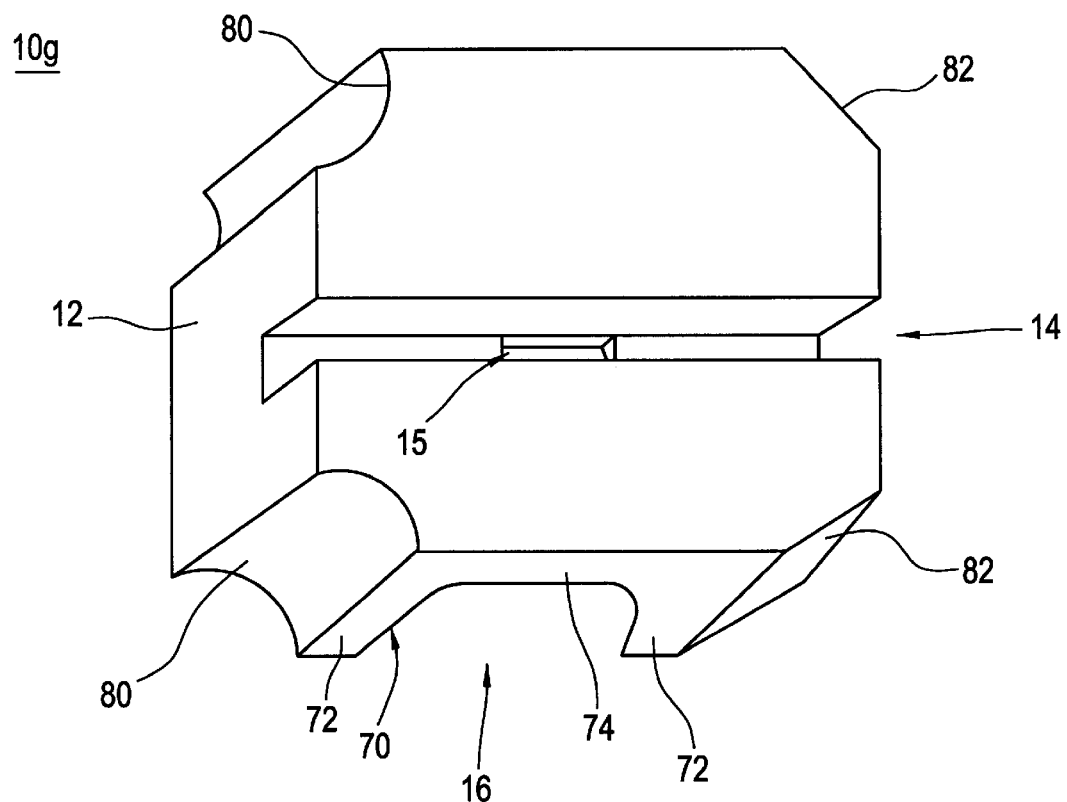
FIG. 17 is a perspective view of an embodiment of a modular floor body according to the present invention.

FIG. 17 is a perspective view of one embodiment of a modular or cellular floor block 10a according to the present invention. An arch 70 is formed from a pair of vertical ribs or lower portions 72 are connected by a transverse portion 74 to define a lower race or a bottom race 16 disposed beneath the transverse portion 74 and between the vertical ribs 72. The inner surface of the arch 70 defines the boundaries of the lower race 16 as having a rise, a span, and a length. The body 12 is provided with a top slot 14 extending into the top surface generally perpendicularly to the lower race 16. The top slot may be utilized as an upper race 14, and a vertical opening 15 connects the upper and lower races 14, 16. Typically, the floor block would generally have flat vertical sides for ease of fit in conjunction with adjacent floor blocks, although other shapes may be utilized as desired with respect to a given application. The block may also be optionally provided with recessed outer vertical corners.

As shown in FIG. 17, the block has two concave corners 80 and two chamfered corners 82 for purposes of illustration herein, although preferably the corners of a particular block or set of blocks are identically formed for ease of production. The block 10g is shown as having a rectangular plan outline, although other shapes may be used.

Figure 18:
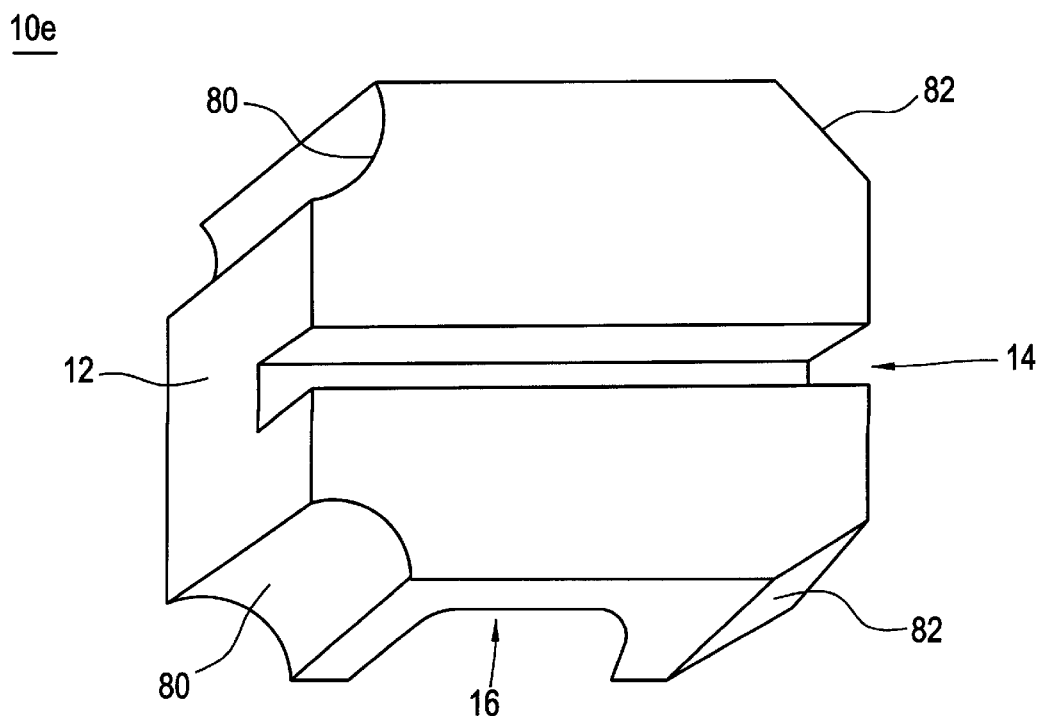
FIG. 18 is a perspective view of another embodiment of a modular floor body according to the present invention similar to the embodiment shown in FIG. 17 but having no vertical opening.

FIG. 18 is a perspective view of another embodiment of a floor block 10e according to the present invention which is similar to the embodiment shown in FIG. 17, however, no vertical opening 15 connects the top and bottom races 14, 16.

FIGS. 17 and 18 show a bottom race 16 having a rounded rectangular or rounded oblong cross-section, although other shapes or cross-sections may be used.

Figure 19:
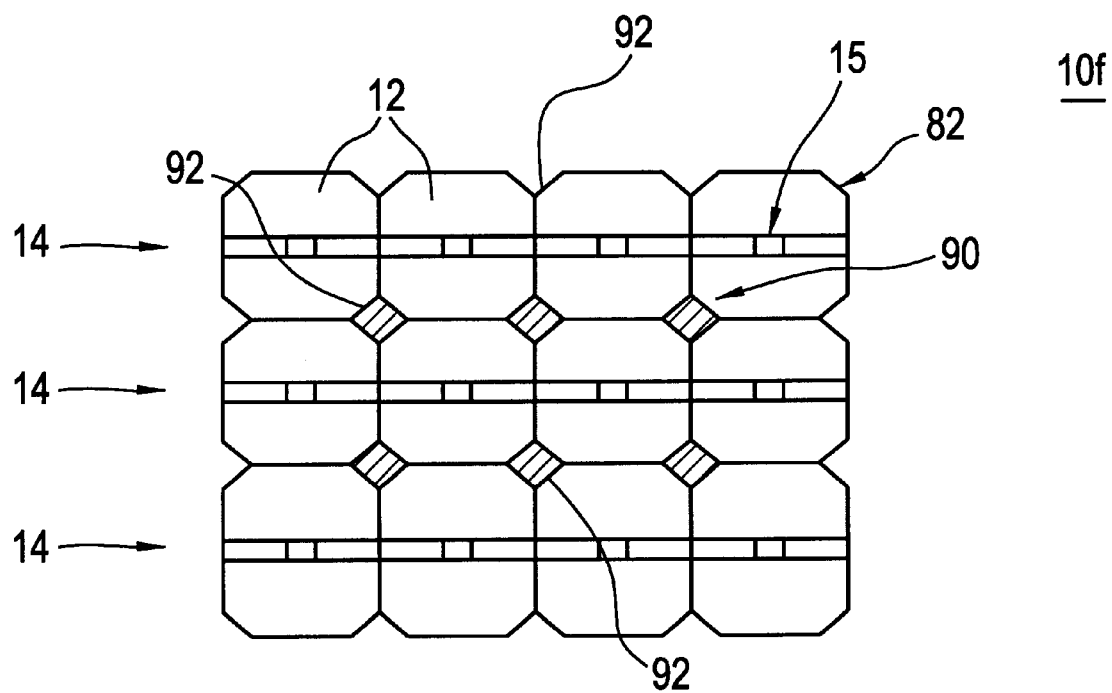
FIG. 19 is a top plan view of one embodiment of an access floor formed from a plurality of contiguous unitary blocks.
Figure 20:
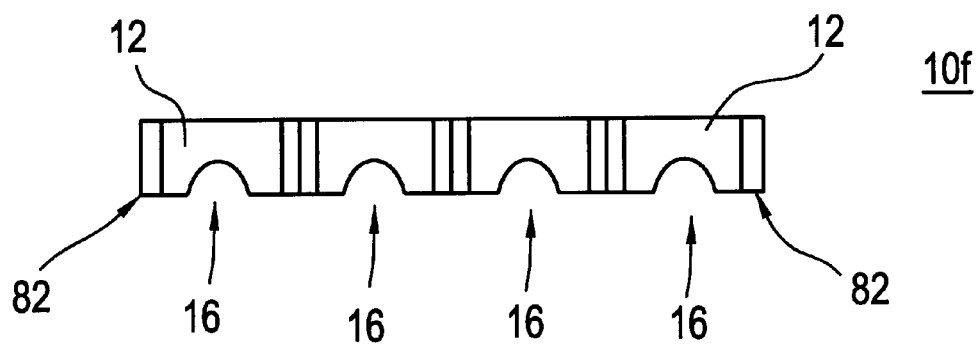
FIG. 20 is a side elevational view of the access floor of FIG. 19.

FIGS. 19–20 show a flooring system 10f according to the present invention comprised of a plurality of floor blocks 12. The blocks 12 are arranged in adjacent relationship, wherein the bottom or lower races 16 are disposed parallel to each other so that the upper races 14 are also disposed parallel to each other and perpendicular to the lower races 16. The vertical openings 15 between the lower and upper races 16, 14 allow communication of services therebetween. Each block 12 has recessed outer vertical corners 82 which are chamfered. Four contiguous recessed outer vertical corners 82 of corresponding adjacent blocks define vertical cavities 90 between the blocks 12 when the blocks are adjacent one another. An anchoring means may be disposed in one or more of the vertical cavities 90. The anchoring means may be a weight or a settable material poured into the vertical cavity 90. An anchoring means exemplary of a poured settable material is illustrated by the shaded region identified by reference numeral 92 in FIG. 19.

FIG. 19 shows a top plan view of the flooring system 10f of blocks 12, while FIG. 20 is an end view which shows the lower races 16.

Figure 21:
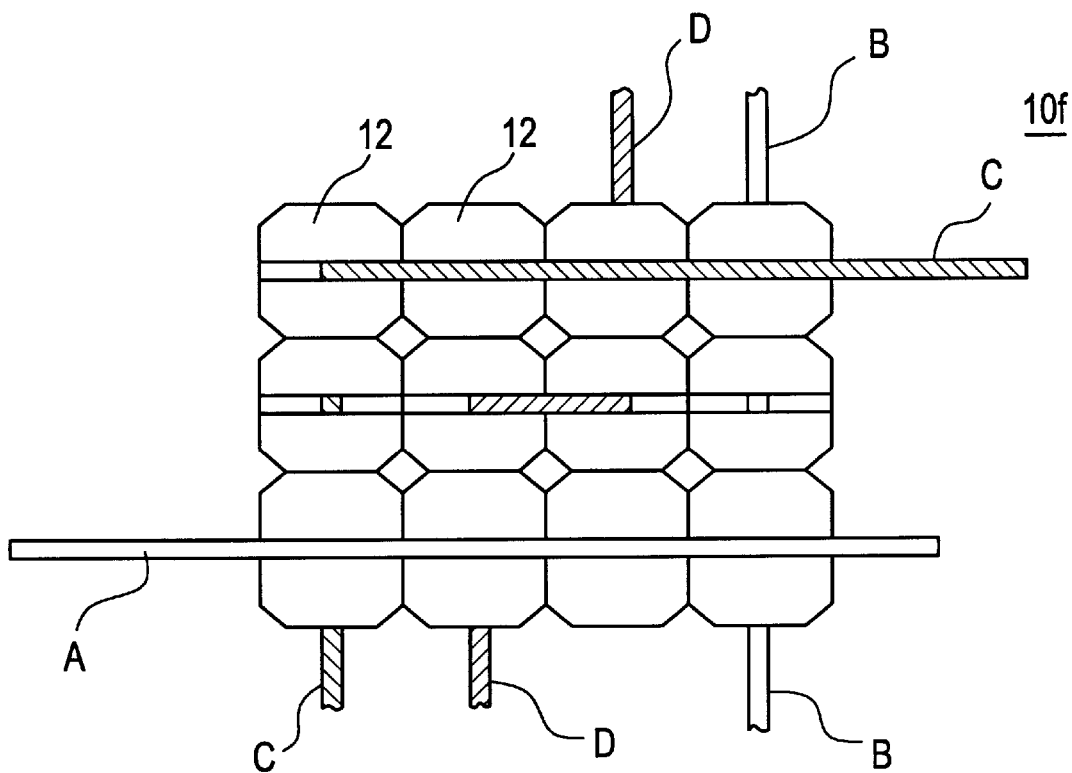
FIG. 21 is a top plan view of the embodiment of FIG. 19 having four conduits disposed therethrough.
Figure 22:
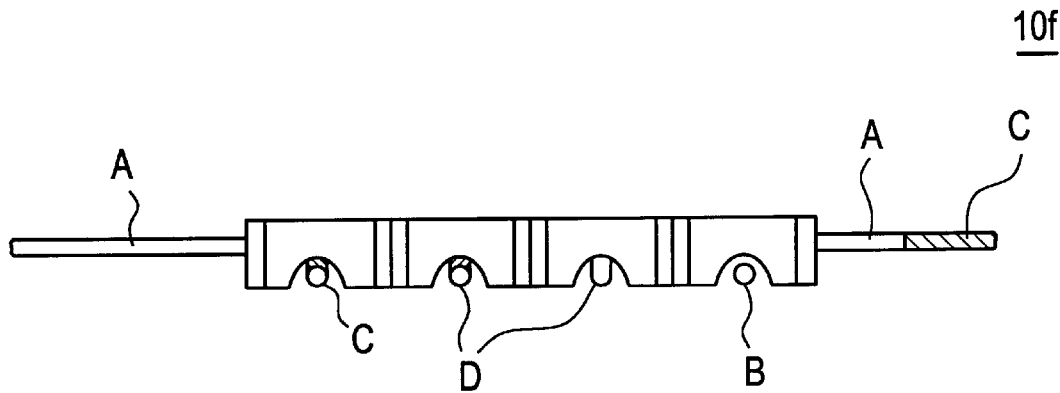
FIG. 22 is a side elevational view of the access floor of FIG. 21.

FIGS. 21 and 22 show the flooring system of FIGS. 19 and 20 with first, second, third, and fourth conduits (A, B, C, and D) passing through the races of the flooring system in separate tracks, similar to the access floor depicted in FIGS. 1–3, but being comprised of a plurality of adjacent modular or cellular blocks or individual bodies 12, instead of a single unitary floor body. The first conduit A in FIG. 21 passes from left to right in a straightforward manner through the top races 14 of the lowermost row of blocks. The second conduit B passes through the bottom races 16 of the rightmost blocks. The third conduit C passes through the bottom races 16 of the leftmost column of blocks, through the vertical opening 15 in the top left block, and through the top races 14 of the top row of blocks. The fourth conduit D passes through the bottom races 16 of the lower two blocks in the column second from left, then up through the vertical opening 15 in the left middle block, through the top races of the two middle blocks, down through the vertical opening 15 in the right middle block, then through the bottom races of the right middle block in the middle row and the right middle block in the top row of blocks.

FIG. 22 shows an end view of the conduits A, B, C, D and flooring system of FIG. 22.

Thus, the floor blocks according to the present invention may be constructed and arranged to provide a plurality of paths for a plurality of conduits, wherein each conduits is separated from the others by the bodies of the adjacent floor blocks.

The present invention further provides a more solid access floor than floor systems currently being used, for example, in computer rooms and the like.

It should be understood that the access floor or floor blocks according to the present invention may be constructed to have a single bottom or lower race, or a plurality of bottom races. Similarly, a single top or upper race, or a plurality of top races may be provided.

The present invention also contemplates floor blocks which may have no lower race, or no top race, as may be desired in a particular application. Thus, a flooring system comprised of a plurality of floor blocks according to the present invention may include a variety of differently configured blocks. In one preferred embodiment, a flooring system according to the present invention includes a plurality of identically configured blocks.

The present invention thus enables two way (X and Y) distribution of services as well as top access to the services. Great flexibility may thus be achieved in running the service lines underneath a floor system according to the present invention. Moreover, a single pathway, isolated from other pathways, may be dedicated to a single service line, such as with a fire alarm line. As a result, the present invention may provide an increased number of service lines which may be carried underneath the flooring system in an organized fashion. Furthermore, the floor of the present invention, whether of a single unitary or monolithic body or a plurality of floor blocks, typically placed closely together, may be adapted to ensure compliance with building codes, such as a requirement to place common/power on 5 feet centers, wherein the races of the blocks would be constructed to provide such separation.

The floor blocks of the present invention may further comprise a spline connection means for connecting adjacent blocks and maintaining their relative alignments.

The present invention also contemplates races which may be neither orthogonally nor parallelly disposed with respect to other races. For example, a pair of upper and lower parallel rows of races may be "connected" at one end by the lower race ending in an upwardly slanted 45° race and by the upper race ending in an downwardly slanted 45° race, thereby providing separate "supply" and "return" paths for the same service line.

The floor blocks or floor bodies according to the present invention may be constructed of a material such as GYP-CRETE® by MAXON, INC. or pourable gypsum or concrete. Thus, a pourable or sprayable material, which is cementitious or settable, such as gypsum products or concrete products, may be inserted into a mold or applied directly onto a subfloor surface.

In a particularly preferred embodiment, the floor blocks or floor bodies of the present invention, which may be present in the form of a unitary, monolithic floor covering or a plurality of cellular or modular blocks to be disposed over a desired portion of subflooring, are made from alpha hemihydrate, also referred to as alpha semihydrate, which is obtainable from NuSource of Parsippany, N.J. and which is distributed by ProMineral of Bergheim, Germany, and as may be variously described in one or more of the following patents which are incorporated herein by reference: U.S. Pat. Nos. 5,093,093; 5,015,450; and 5,015,449. Some of the advantages provided by the alpha hemihydrate are an ability to be poured in a relatively nonviscous state, an ability to rapidly self-level and to set quickly with a minimum of shrinkage to yield a high strength and dimensionally stable resultant structure. Required setup or installation times may also be reduced given the beneficial properties of the alpha hemihydrate as compared with other materials.

For example, use of the alpha hemihydrate would eliminate the necessity of impacting or vibrationally spreading the material, as would be necessary with other more viscous materials.

By way of another example, the alpha hemihydrate facilitates the use of displacement members for forming the top races, wherein the displacement member may sink into the alpha hemihydrate to a desired level, whereafter the displacement member floats on top of the alpha hemihydrate material.

Other materials, such as concrete comprised of aggregate, may not easily allow such implementation of a displacement member, wherein these other materials may impede the sinking of the displacement member adequately to form a top race; thus, these other materials may even tend to cause the displacement member to pop up out of the material, wherein it may be necessary to apply additional force to keep the displacement in a proper position; furthermore, insertion of a displacement member into other materials may cause shifts in water concentrations or water levels and may result in an unlevel final surface. Thus, the top race may need to be formed by cutting into the material, either when partially set or when fully set.

Generally, formation of the top slots by utilizing displacement members should be easier and more cost effective than cutting into the material, resulting in shorter installation times and lower labor costs.

Furthermore, the access floor according to present invention may be attached to the sub-floor by, for example, shear connectors to tie the floor topping to the base floor system.

Thus, the present invention may be employed in a wide variety of applications. The present invention may manage and carry a plurality of conduits or service lines beneath the top floor surface. For example, fire, communication, power, HVAC or other systems may be run through the raised floor of the present invention.

By way of further example, air may be forced through one or more of the bottom raceways, either coincident with a service line or in a dedicated raceway which may be separated from any other raceway. Thus, the raceways provided by the present invention may provide a system for supply and/or return of air for heating, cooling, and/or ventilation. In a particular example, air may be passed through one or more bottom raceways (without any vertical openings to any top raceways) in order to heat up or cool down the floor body or floor blocks, thereby relying on the thermal mass of the floor body or floor blocks to provide air conditioning to the room above. Such heating or cooling may be particularly efficient if, for example, air is heated or cooled and circulated during off-peak utility hours for a given power generation source or utility, thereby driving down the energy cost of operation and maintenance. For example, the raised floor of the present invention may be cooled during the night in order to provide a radiant heat sink for the following day. Such a method of heating or cooling also enables thermal management of the radiative heat transfer within the room in addition to regulating the room air temperature, thereby enhancing environmental or comfort control.

By way of another example, air may be forced through one or more bottom raceways, through one or more vertical openings into one or more top slots, and out of the raised floor of the present invention and into the room to provide forced air ventilation of the room. Air may also be returned through one or more raceways in the raised floor, whereby the entire air supply/return distribution flow passes through the raised floor. In one particular embodiment, the supply air may exit the raised floor around the outer periphery of the room, and the return air may pass through the middle portion of the raised floor which could serve as a plenum return. The present invention therefore may provide an improved thermal management system for buildings and structures.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A flooring system comprised of a plurality of cellular floor blocks having a top surface and a bottom surface each block comprising at least one arch defining a lower race in the bottom surface of each block, and at least one transverse top slot defining an upper race in the surface of each block, wherein said blocks are arranged in adjacent relationships selected from the group consisting of:

a first arrangement wherein said lower races are disposed parallel to each other and said upper races are disposed linear to each other and perpendicular to said lower races; and a second arrangement wherein said lower races are disposed linear to each other and said upper races are disposed parallel to each other and perpendicular to said lower races.

2. The flooring system according to claim 1 wherein said floor blocks are comprised of alpha hemihydrate.

3. The flooring system according to claim 1 further comprising anchoring means for maintaining said blocks stationary.

4. The flooring system according to claim 3 wherein each said block further comprises recessed outer vertical corners, wherein a plurality of contiguous recessed outer vertical corners of corresponding adjacent said blocks define a vertical cavity, and wherein said anchoring means is disposed in said vertical cavity.

* * * * *